(12) United States Patent
Marhefka et al.

(10) Patent No.: US 10,634,939 B2
(45) Date of Patent: Apr. 28, 2020

(54) SELECTIVELY ERASABLE EWRITER WITH USER ADJUSTMENT

(71) Applicant: Kent Displays Inc., Kent, OH (US)

(72) Inventors: Duane Marhefka, Kent, OH (US); Clinton Braganza, Kent, OH (US)

(73) Assignee: Kent Displays Inc., Kent, OH (US)

( * ) Notice: Subject to any disclaimer, the term of this patent is extended or adjusted under 35 U.S.C. 154(b) by 74 days.

(21) Appl. No.: 16/103,500

(22) Filed: Aug. 14, 2018

(65) Prior Publication Data

US 2019/0056611 A1   Feb. 21, 2019

Related U.S. Application Data

(60) Provisional application No. 62/545,874, filed on Aug. 15, 2017.

(51) Int. Cl.
| | |
|---|---|
| G02F 1/133 | (2006.01) |
| G02F 1/1333 | (2006.01) |
| G02F 1/1334 | (2006.01) |
| G02F 1/137 | (2006.01) |
| G06F 3/041 | (2006.01) |
| G06F 3/0488 | (2013.01) |
| G09G 3/36 | (2006.01) |
| G02F 1/1335 | (2006.01) |

(52) U.S. Cl.
CPC ........ *G02F 1/13306* (2013.01); *G02F 1/1334* (2013.01); *G02F 1/13718* (2013.01); *G02F 1/133305* (2013.01); *G06F 3/0416* (2013.01); *G06F 3/04883* (2013.01); *G09G 3/3629* (2013.01); *G02F 1/13338* (2013.01); *G02F 1/133512* (2013.01); *G02F 1/133555* (2013.01); *G09G 3/3696* (2013.01); *G09G 2310/061* (2013.01); *G09G 2354/00* (2013.01); *G09G 2380/02* (2013.01)

(58) Field of Classification Search
None
See application file for complete search history.

(56) References Cited

U.S. PATENT DOCUMENTS

| | | |
|---|---|---|
| 4,525,032 A | 6/1985 | Hilsum |
| 5,453,863 A | 9/1995 | West et al. |
| 5,691,795 A | 11/1997 | Doane et al. |

(Continued)

*Primary Examiner* — Nicholas J Lee
(74) *Attorney, Agent, or Firm* — Serbinowski LLC

(57) ABSTRACT

A liquid crystal eWriter device with user adjustable select erase includes a front substrate formed of a flexible, polymeric material. Electrically conductive layers are spaced apart from each other. A dispersion layer includes a dispersion of cholesteric liquid crystal material and polymer disposed between the electrically conductive layers, wherein pressure applied to the front substrate changes a reflectance of the cholesteric liquid crystal material forming an image. Electronic circuitry is adapted to fully and selectively erase the image by applying a full erase voltage waveform and a select erase voltage waveform, respectively, to the electrically conductive layers. The image is select erased by applying the select erase voltage waveform to the electrically conductive layers while applying pressure to the front substrate and tracing a portion of the image. At least one SELECT ERASE actuator is included in the electronic circuitry and enables the user to adjust the select erase voltage waveform so as to adjust select erasing of the image. Also featured is a method of making select erase adjustments on the eWriter.

21 Claims, 11 Drawing Sheets

(56) References Cited

U.S. PATENT DOCUMENTS

| | | |
|---|---|---|
| 6,104,448 A | 8/2000 | Doane et al. |
| 8,139,039 B2 | 3/2012 | Schneider et al. |
| 8,228,301 B2 | 7/2012 | Schneider |
| 9,116,379 B2 | 8/2015 | Braganza et al. |

SELECTIVELY ERASABLE EWRITER WITH USER ADJUSTMENT

TECHNICAL FIELD

This disclosure relates to the field of cholesteric LCD eWriter devices and, in particular, to eWriters having a select erase feature.

BACKGROUND

There have been various technological approaches to produce a writing device as a replacement of paper and pencil or chalk on slate. The best known examples are toys. The ETCH-A-SKETCH™, introduced in the 1960s, is one such device. In this device, a movable stylus removes a powder material from inside a screen to make a dark line. The image is erased by turning the device upside down and shaking it to smooth out the surface. Another famous example is the MAGNA DOODLE™, which is a magneto-phoretic device in which a stylus with a magnet on the tip is used as the pen to draw a line. The device is erased with a thin long magnet behind the screen. Over 40 million of these devices have been reportedly sold.

Other LCD writing devices have also been proposed. U.S. Pat. No. 4,525,032 to Hilsum is one such example where cholesteric or a smectic liquid crystal is used to provide a semi-permanent record of the path traced by a stylus on a display and used as a re-usable writing pad. According to Hilsum a layer of a liquid crystal material is contained between two substrates. A stylus having a tip contacts the front substrate and changes the state of selected areas of the liquid crystal layer at positions adjacent the pen tip to provide observable information corresponding to the pen movement. The pen may have a pointed tip, a heated tip, a light emitting tip, or a tip connected to a high voltage high impedance source. At least one substrate of the display can be deformable, thin, or flexible so that the liquid crystal layer may be changed from one state to another by localized application of pressure, heat, light, electrostatic charge, or an electric field. The resultant image on the display is erased by deformation of the layer, e.g. flexing, heating and cooling, or by an electrical field.

A practical problem with the Hilsum device is erasing the image. It is slow and inconvenient to heat or flex the device to erase the image. Hilsum discloses an electronic means of erasure using a special cholesteric liquid crystal in which the frequency of an AC field is applied to the stylus or electrodes. The frequency is changed to enable a writing state or an erasure state. However, this is not without problems in that crossover frequency between writing and erasing is strongly temperature dependent and the frequencies as well as the voltages are very high, consuming a lot of power causing very limited battery lifetime.

A considerable improvement was made with the discovery of bistable cholesteric liquid crystals (see U.S. Pat. No. 5,453,863). Cholesteric liquid crystalline materials are unique in their optical and electro-optical features. These materials possess a helical structure in which the liquid crystal (LC) director twists around a helical axis. The reflected light is circularly polarized with the same handedness as the helical structure of the LC. They can be tailored to Bragg reflect light at a pre-selected wavelength and bandwidth by controlling the pitch of the helical twist through the concentration of chiral dopants and the birefringence of the nematic host, respectively. If the incident light is not polarized, it will be decomposed into two circular polarized components with opposite handedness and one of the components reflected.

The cholesteric material is typically electrically switched to either one of two stable textures; planar or focal conic as described, for example, in the U.S. Pat. No. 5,453,863. In the planar texture, the director of the LC (direction of the long axis of the molecule) is uniformly parallel to the plane of the substrates across the cell but has a helical twist perpendicular to the plane of the substrates. It is the helical twist of the uniform planar texture that Bragg reflects light in a selected wavelength band. The focal conic texture contains defects that perturb the orientation of the liquid crystalline helices. In the typical focal conic texture, the defect density is high; thus the helical domain size becomes small and randomized in orientation such that it is just weakly scattering and does not reflect impinging light (i.e., it is substantially transparent to incident light). Once the defect structures are created, they are topologically stable and cannot be removed unless by some external force such as an electric field or melting the material out of the liquid crystalline phase to the isotropic. Thus, the focal conic texture remains stable and forward scatters light of all wavelengths into an absorbing (usually black) background. These bistable structures can be electronically switched between each other at rapid rates (on the order of milliseconds). Gray scale is also available within a single pixel through various switching schemes in order to adjust the density of reflective helical domains that are oriented perpendicular to the substrates (planar texture) to the randomized forward scattering domains (focal conic texture).

Bistable cholesteric liquid crystal displays have several electronic drive features that other bistable reflective technologies do not. For addressing a matrix of many pixels in a display, the characteristic of a voltage threshold is used. A threshold is used for multiplexing a row/column matrix without the need of an expensive active matrix (transistor at each pixel). Bistability with a voltage threshold allows very high-resolution displays to be produced with low-cost passive matrix technology. Gray scale capability allows stacked RGB, high-resolution displays with full-color capability where as many as 4096 colors have been demonstrated.

In a cholesteric liquid crystal display, the liquid crystal is typically sandwiched between two substrates that are spaced to a particular gap. The substrates can be either glass or polymer. The bottom substrate is painted with a light absorbing (black or colored) background. The cell gap is usually set by polymer or glass spacers that are either cylindrical or spherical in shape. In most cholesteric liquid crystal displays, the cell gap is not intentionally changed. If one presses on the top substrate of the cholesteric LCD, the liquid crystal can be displaced (since fluids are not very compressible) and induced to flow radially out of the area. Of principle interest is that when the focal conic texture of the cholesteric liquid crystal is induced to flow, the resulting texture is the planar state. The reflective planar state contrasts well to the dark focal conic background. This is a principle behind U.S. Pat. No. 6,104,448 "Pressure Sensitive Liquid Crystalline Light Modulating Device and Material," incorporated herein by reference in its entirety, which discloses that application of a mechanical stress to the liquid crystalline light modulating material changes an initial light scattering focal conic texture to the light reflecting planar texture. The U.S. Pat. No. 6,104,448 discloses a polymer network that is soluble with the chiral nematic liquid crystal and phase separates to form separated polymer domains that stabilize the thickness of the cell structure.

In U.S. Pat. No. 6,104,448, an image can be written on the device with an untethered stylus or fingernail. The entire image is erased with the push of a button that applies a low voltage DC pulse to the cholesteric device. Other advantages of bistable cholesteric materials is that an image created on the writing pad display does not degrade with time and lasts indefinitely without application of an electric field, until erased. The time for erasing the entire image is less than a second, making the bistable cholesteric liquid crystal display a practical device for a writing pad. However, the device of the U.S. Pat. No. 6,104,448 completely erases the entire writing surface and does not erase selected portions of the image.

eWriter with Select Erase by Kent Displays Inc.

U.S. Pat. No. 8,139,039 discloses an LCD writing tablet or eWriter using bistable cholesteric liquid crystal technology that can be selectively erased. The U.S. Pat. No. 8,139,039 patent is incorporated herein by reference in its entirety and this disclosure includes the following text and figures excerpted from that patent. The U.S. Pat. No. 8,139,039 patent describes writing tablet devices and methods for selectively erasing the tablet using an untethered stylus. The selectively erasable writing tablet works in different Modes: Mode A, B and multimode (in the case of a multilayer device). In Mode A, the pressure of an instrument (e.g., an untethered pointed stylus) creates a transparent focal conic texture line on a colored planar texture background where all layers are switched to the planar texture. In Mode B, which is disclosed in prior art such as the U.S. Pat. No. 6,104,448, the stylus creates a colored planar texture line on a transparent focal conic background where all layers are switched to the focal conic texture. In multimode (for a multilayer device), the pressure of an instrument creates a colored planar texture line or a focal conic texture line on a user selected colored texture background where the layers in the background can be either planar, focal conic or gray scale. In Modes A and B and multimode a gray scale reflective texture can be employed for the background and/or the written portion that has a reflectance between a maximum level of reflectance of the planar texture and a minimum level of reflectance of the focal conic texture. Gray scale can be formed by varying voltage or pressure as discussed in U.S. Pat. No. 8,228,301, which is incorporated herein by reference in its entirety. Contrast in the writing pad is created between the transparent focal conic texture which shows the light absorbing back-layer color or black and the reflective (color) planar and gray scale textures.

Turning now to a more specific discussion of the prior art LCD writing device by Kent Displays Inc. having select erase capability, much of which is extracted from the U.S. Pat. No. 8,139,039 patent owned by Applicant, a bistable cholesteric LCD writing device or eWriter is illustrated in FIG. 1 and is incorporated herein by reference for all of its features, modified as described in the Detailed Description below. The LCD eWriter includes substrates 11 of flexible material, polymeric material or plastic being preferred. The inner surfaces of the substrates are coated with transparent electrically conductive layers or electrodes 12 (preferably unpatterned but possibly patterned) from materials such as indium tin oxide (ITO) or a conducting polymer such as PEDOT. Sandwiched between the adjacent electrodes is a bistable cholesteric liquid crystal material 23. The droplets of liquid crystal are not encapsulated and are thus unconfined with interconnecting droplets. The dispersions may be of the type prepared by polymerization induced phase separation (PIPS) as is known in the art. The conductive electrodes 12 are connected with electrical interconnects 14 to electronic circuit 25 that provides suitable voltages to the conductive electrodes 12, usually in the form of a voltage pulse, in order for pressure of the stylus to create an image.

Planar Writing on a Focal Conic Background, Mode B:

In this embodiment in which the liquid crystal is initially in the focal conic texture, while not wanting to be bound by theory, flow of the liquid crystal forms the planar texture, under the pressure of a stylus without application of a voltage, in order to write. The image is created by the planar writing or drawing contrasting against the focal conic background. Once an image has been made on the eWriter it can be electronically erased. The conductive electrodes 12 are connected with electrical interconnects 14 to electronic circuit 25 that provides suitable voltages to the conductive electrodes 12, usually in the form of a pulse, in order to selectively or fully erase an image. The circuit 25 is first switched to operate in Mode B (planar writing on a focal conic background) and then the user can select the various functions; write, select erase, or full erase.

Mode B Full Erase:

The procedure of writing an image on the inventive cell in Mode B is to first fully erase all previous images by selecting the "Mode B full erase" function of the circuit 25. This applies an erasing voltage of value Vf indicated by vertical line 37 of FIG. 2 to drive the entire cell initially to the focal conic texture. The value of the voltage or magnitude of a voltage pulse to do this is well known in the art of a bistable cholesteric liquid crystal displays; e.g., U.S. Pat. Nos. 5,453,863 and 5,691,795. This erases the writing tablet to the mostly transmissive focal conic texture so that the background (black or a backcolor) of the writing tablet is due to revealing the back layer 19 of FIG. 1.

Mode B Write:

In order to write an image using stylus 16 in Mode B, one activates the "Mode B write" function on the circuit 25 such that no voltage is applied to the writing tablet. In Mode B, which is disclosed in prior art such as the U.S. Pat. No. 6,104,448, the stylus creates a colored planar texture line on a transparent focal conic background. Contrast in the LCD writing device is created between the transparent focal conic texture which shows the back-coating 19 (typically black) and the reflective (color) planar texture of the cholesteric liquid crystal. An example of a selectively erasable writing tablet cell operating in Mode B is photographed in FIG. 3. The write circuit 25 can fully erase any image by selecting the "Mode B full erase" function to provide a focal conic erase voltage Vf 37 to the tablet. It is seen by FIG. 2 that a voltage Vf 37 will drive the entire cell to the focal conic texture, erasing the planar writing. The voltage may be an AC voltage pulse or a sequence of pulses, preferably bipolar pulses.

Mode B Select Erase:

In order to selectively erase an image using stylus 16, one activates the "Mode B select erase" function on circuit 25 such that a voltage Vw 36 is applied to the writing tablet. The voltage is applied for the duration of the pressure applied by the stylus; preferably a continuous AC voltage or a sequence of bipolar pulses. The voltage is applied to the patterned or unpatterned electrodes so that the entire display area of liquid crystal seen by the user of the writing tablet, has an electric field applied to it. It is seen by curve 32 in FIG. 2 that a voltage Vw 36 with applied pressure will selectively erase by driving that area of the cell to the focal conic texture; that is, areas of the cell under the stylus where pressure is applied and cell gap is reduced. The planar texture in that area is driven to the focal conic as illustrated by the dashed curve 32. In the remainder of the cell where the cell gap is not disturbed, even though the electric field has been applied there, writing on the cell in which the material is in the planar texture remains planar as indicated by the solid curve 31, leaving a focal conic background for the planar written portion. In other words, the planar writing where the cell gap is undisturbed remains in the planar texture as shown where line Vw intersects the solid line 31 (undepressed cell gap) while the voltage Vw is applied to the electrodes and is not converted to the focal conic texture. The regions of the writing tablet that are selectively erased to the focal conic texture blend with the switched focal conic texture of the background such that the erased line does not contrast, as is evident in FIG. 4. Note that the planar line of FIG. 3 underneath the planar text "Select Erase" was retraced while the tablet was in select erase mode and is barely visible in FIG. 4.

Turning away now from the excerpt of the U.S. Pat. No. 8,139,039, Mode B select erasing employs application of suitable voltages to the writing tablet electrodes during application of pressure to the writing tablet. However, the voltage levels that are suitable for a given device at any particular time are dependent on a number of factors. Without wanting to be bound by theory, some of these factors may include liquid crystal formulations and processing, device to device variations as a result of manufacturing tolerances, temperature, device aging, and device history such as amount of ultraviolet light and heat exposure.

It would be desirable to have an electronic LCD eWriter device in which the voltage waveforms applied to the electrodes during Mode B select erasing are adjustable to address differences between devices that result from liquid crystal formulations and processing, manufacturing tolerances, aging, and history, as well as to support a wide range of operating conditions.

TECHNICAL SUMMARY OF THE DISCLOSURE

This disclosure describes an eWriter designed with select erase capability, which provides the user with an ability to adjust select erase voltage waveforms so as to address the problems above regarding differences between devices that result from liquid crystal formulations and processing, manufacturing tolerances, aging, and history, as well as to support a wide range of operating conditions. The waveform adjustment can be made in Mode B select erasing. For example, adjusting voltage of the voltage waveform adjusts a value of write voltage, Vw, shown in FIG. 2 up or down (right or left, respectively, along the x axis). Select erase pressure is applied to the upper substrate of the eWriter to trace a portion of the image intended to be select erased, while Vw is applied. When it is desired to darken the appearance of the select erase focal conic line in Mode B (i.e., to increase select erase of the planar line) Vw is increased, which leads to a greater focal conic texture where select erase pressure is applied (dotted curve of FIG. 2 intersected by Vw) while not changing areas in which pressure is not applied (solid curve of FIG. 2 intersected by Vw remaining in the planar, bright texture). On the other hand, if Vw is too high so that the image dims when applying the voltage waveform without applying pressure, Vw can be lowered. Mode B only applies a voltage for select erasing, not while writing, and thus is a low power mode. The user adjustment in Mode B changes the appearance of the select erase focal conic texture so that the image is more completely select erased. In other words, the focal conic select erase tracing more closely resembles the focal conic background rather than leaving portions of the select erased line visible in contrast with the background.

A first aspect of this disclosure features a liquid crystal eWriter device with user adjustable select erase. The eWriter includes a front substrate formed of a flexible, polymeric material. Electrically conductive layers (e.g., electrodes) are spaced apart from each other. A dispersion layer includes a dispersion of cholesteric liquid crystal material and polymer disposed between the electrically conductive layers. Pressure applied to the front substrate changes a reflectance of the cholesteric liquid crystal material forming an image. Electronic circuitry is adapted to fully and partially erase the image by applying a full erase voltage waveform and a select erase voltage waveform, respectively, to the electrically conductive layers. The image is select erased by applying the select erase voltage waveform to the electrically conductive layers while applying pressure to the front substrate and tracing a portion of the image. At least one SELECT ERASE actuator is included in the electronic circuitry and enables the user to adjust the select erase voltage waveform so as to adjust the select erasing of the image.

Terms such as up, down, front and back, and the like that may be used in this disclosure are not intended to limit the disclosed subject matter, but are provided merely to improve understanding thereof. In addition, the terms "partial erase" and "select erase" are used interchangeably herein. The term eWriter as used herein encompasses all cholesteric liquid crystal writing/drawing devices of any size and shape, in particular those that employ a dispersion of cholesteric liquid crystal material and polymer. When reference is made to the location of the user, this means the same side of the eWriter where the pressure is applied with a stylus or fingernail. Unless otherwise indicated in this disclosure, reference to adjusting the select erase voltage waveform (e.g., in Mode B) can adjust the amplitude, frequency, or duty cycle of the applied waveform in a manner that increases or decreases the RMS (root mean square) voltage appearing on the electrodes across the liquid crystal material. Also, voltage adjustments to the select erase voltage waveform is taken to have the same meaning as amplitude adjustments of the select erase voltage waveform and adjusts the RMS voltage. Reference to putting the liquid crystal eWriter device in SELECT ERASE MODE means activating a SELECT ERASE actuator which causes the select erase voltage waveform to be applied. Other variations in adjusting the waveforms may also be suitable for use in this disclosure and are contemplated within its scope.

It should be apparent to a person having ordinary skill in the art that the disclosure should not be limited to particular switches or actuators described or actions for activating or applying or deactivating/releasing the switches or features thereof. Switches, actuators and features thereof come in many forms and are presented to the user in various ways including, but not limited to, a button, lever, dial, and the like.

The eWriter of this disclosure that can adjust Mode B select erasing may be multimode or include independently written and erased, stacked dispersion layers, as would be appreciated by one of ordinary skill in the art in view of this disclosure.

Referring to a specific feature of the first aspect of the disclosure, the electronic circuitry includes electronic drive circuitry, a bias circuit and a processor that is programmed with software that enables adjustable select erase voltage waveforms to be applied to the electrically conductive layers. The at least one SELECT ERASE actuator comprises a first SELECT ERASE actuator, a SELECT ERASE-UP actuator and a SELECT ERASE-DOWN actuator. Activating the first SELECT ERASE actuator puts the device in SELECT ERASE MODE. While the SELECT ERASE MODE is on, activating the SELECT ERASE-UP actuator or the SELECT ERASE-DOWN actuator increases or decreases, respectively, the RMS voltage of the select erase voltage waveform. The processor adjusts the RMS voltage up or down according to one of the following:

by configuring the bias circuit to provide a DC voltage of a desired waveform amplitude to the drive circuit;

when the bias circuit is configured to output a fixed DC voltage, by configuring the drive circuit to vary a duty cycle of applied pulses; and when the bias circuit is configured to output a fixed DC voltage, by configuring the drive circuit to vary a frequency of applied pulses, relying on RC effects to lower the RMS voltage as frequency is increased.

In another feature the eWriter device includes a FULL ERASE actuator included in the electronic circuitry, wherein activating the FULL ERASE actuator applies the full erase voltage waveform that erases all of the images on the device.

In another feature, the at least one SELECT ERASE actuator comprises a first SELECT ERASE actuator, a SELECT ERASE-UP actuator and a SELECT ERASE-DOWN actuator. Activating the first SELECT ERASE actuator puts the device in SELECT ERASE MODE. Activating the SELECT ERASE-UP actuator in SELECT ERASE MODE enables a user to change characteristics of the select erase voltage waveform so as to increase select erasing and activating the SELECT ERASE-DOWN actuator in SELECT ERASE MODE enables the user to change characteristics of the select erase voltage waveform so as to decrease the select erasing. Deactivating the first SELECT ERASE actuator takes the device out of SELECT ERASE MODE. In this disclosure, deactivating the first SELECT ERASE actuator (e.g., a button as part of a switch) can occur in different ways, including "releasing the button", or in which a first press of the button puts one into the SELECT ERASE MODE and a second press of the button exits the SELECT ERASE MODE.

In another feature the SELECT ERASE-UP actuator and the SELECT ERASE-DOWN actuator include features enabling making small adjustments in amplitude of the select erase voltage waveform and making larger adjustments in amplitude of the select erase voltage waveform. Further, the small amplitude adjustments can be made in increments ranging from 50 mV to 250 mV. Still further the larger amplitude adjustments can be made in increments ranging from 1V to 2V.

In yet another feature the processor limits adjustments in the RMS voltage of the select erase voltage waveform to fall within at least one of a predetermined voltage increment and a predetermined voltage range.

Another feature includes an indicator light as part of the electronic circuitry, wherein the indicator light indicates when the select erase voltage waveform is being adjusted.

In another feature the eWriter device includes an indicator light. For example, in a specific feature the indicator light produces a first indication when the SELECT ERASE-UP actuator is activated and produces a second indication when the SELECT ERASE-DOWN actuator is activated, which provides feedback to the user that the intended select erase voltage waveform change was registered.

In another feature the indicator light produces a first indication when the small voltage feature is activated and produces a second indication when the larger voltage feature is activated, which provides feedback to the user that the intended voltage change of the select erase voltage waveform was registered.

In another feature the at least one SELECT ERASE actuator includes a first SELECT ERASE actuator adapted to put the device in SELECT ERASE MODE and a potentiometer with a rotating or sliding contact, wherein an adjustable voltage divider of the potentiometer enables adjustment of the select erase voltage waveform.

In another feature the at least one SELECT ERASE actuator includes a first SELECT ERASE actuator adapted to put the device in SELECT ERASE MODE and a potentiometer with a rotating or sliding contact. An adjustable voltage divider of the potentiometer enables adjustment of the select erase voltage waveform, the circuitry including an analog to digital converter that converts an analog voltage level of the potentiometer to a digital signal corresponding to the adjusted select erase voltage waveform.

In another feature the at least one SELECT ERASE actuator includes a first SELECT ERASE actuator adapted to put the device in SELECT ERASE MODE and a potentiometer with a rotating or sliding contact. The potentiometer is configured as a variable resistor and placed in series with one of the electrical interconnects of the eWriter display. The select erase waveform is applied at a frequency such that tuning the variable resistor alters the RMS voltage of the select erase waveform on the conductive electrodes of the display by changing an RC time constant comprised of resistance in series with the dispersion layer and the capacitance of the dispersion layer.

Yet another embodiment includes a FULL ERASE actuator having a first feature to carry out full erase and at least one second feature to adjust the amplitude of the select erase voltage waveform. The at least one SELECT ERASE actuator includes the at least one second feature of the FULL ERASE actuator and a first SELECT ERASE actuator. Activating the first SELECT ERASE actuator applies the select erase voltage waveform, and simultaneously applying the at least one second feature of the FULL ERASE actuator:

in a first instance drops the amplitude of the select erase voltage waveform to a minimum level, and in subsequent instances successively increases the amplitude of the select erase waveform by a set increment up to a maximum level.

Another feature may include a LOCK actuator which when activated prevents the FULL ERASE actuator from carrying out full erase.

Another specific feature includes a FULL ERASE actuator having a first feature to carry out full erase and at least one second feature to adjust an amplitude of said select erase voltage waveform. The at least one SELECT ERASE actuator includes the at least one second feature of the FULL ERASE actuator and a first SELECT ERASE actuator. Activating the first SELECT ERASE actuator applies the select erase voltage waveform, and simultaneously applying the at least one second feature of the FULL ERASE actuator enables at least one of:

selecting and applying a small increment in the amplitude of said select erase voltage waveform or a larger increment in the amplitude of said select erase voltage waveform, and selecting and applying the amplitude of said select erase voltage waveform up or down.

In any of the above features or embodiments, the at least one second feature comprises: a) at least one of a single or double click on the FULL ERASE actuator, and b) a short pressing or a longer pressing of the FULL ERASE actuator.

Yet another specific feature is that the electronic circuitry of the liquid crystal eWriter device includes an ERASE actuator that is single and momentary. A double-click of the ERASE actuator causes full erase. Pressing and holding the ERASE actuator causes the ERASE actuator to perform as the at least one SELECT ERASE actuator and for the device to be put in SELECT ERASE MODE for the duration the ERASE actuator is held. A single-click of the ERASE actuator followed immediately by a hold enables select erase at decreased amplitude of the select erase voltage waveform; and a double-click of the ERASE actuator followed immediately by a hold enables select erase at increased amplitude of the select erase voltage waveform.

In another specific feature of the first aspect the liquid crystal eWriter device includes an opaque light absorbing layer disposed more distal from the front substrate than the dispersion layer is from the front substrate, wherein the light absorbing layer absorbs light that passes through the dispersion layer.

In another specific feature of the first aspect the liquid crystal eWriter device includes a semitransparent back layer disposed more distal from the front substrate than the dispersion layer is from the front substrate, wherein the semitransparent back layer absorbs light that passes through the dispersion layer, reflects grey light or light of a color and is light transmitting.

In another specific feature the liquid crystal eWriter device of the first aspect includes substrates spaced apart from each other including the front substrate. The front substrate is formed of a flexible, optically clear polymeric material. The electrically conductive layers are disposed between the substrates.

A second aspect of the disclosure features a method of adjusting select erase on the eWriter of the first aspect of the disclosure, the eWriter including an image, the method including the following steps. (a) A first of the at least one SELECT ERASE actuator is activated. (b) The select erase voltage waveform is applied while applying the select erase pressure tracing a portion of the image. (c) The user observes the extent of select erasing of the image. (d) If the image is not able to be select erased or requires excessive select erase pressure to select erase, then the user adjusts the at least one SELECT ERASE actuator to adjust the select erase voltage waveform to increase select erasing. Optionally repeating any of steps (b)-(d). Once the image is select erased to the extent desired by the user, the user deactivates the first SELECT ERASE actuator.

In a specific feature the method includes:
(e1) evaluating whether the image dims while the select erase voltage waveform is applied but the select erase pressure is not applied;
(e2) if results of step (e1) are positive, then the user adjusts the at least one SELECT ERASE actuator to adjust the select erase voltage waveform to decrease select erasing; and
optionally repeating any of steps (b)-(d), (e1) and (e2).

Many additional features, advantages and a fuller understanding of the disclosure will be had from the accompanying drawings and the Detailed Description that follows. It should be understood that the above Technical Summary describes the subject matter of the disclosure in broad terms while the following Detailed Description describes the subject matter of the disclosure more narrowly and presents preferred embodiments that should not be construed as necessary limitations of the broad subject matter of the disclosure.

Figure 1:
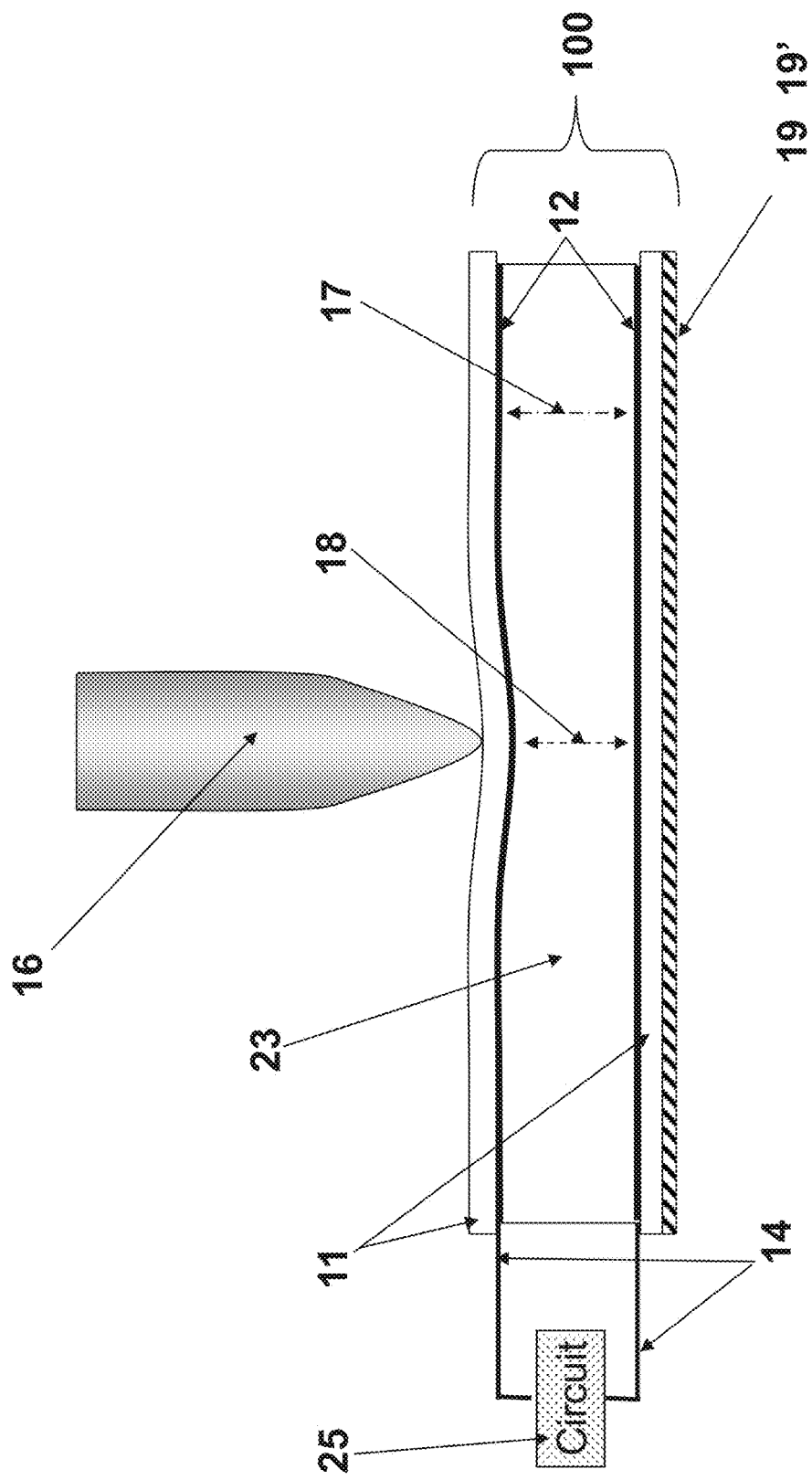
FIG. 1 (PRIOR ART): Schematic illustration of a single layer selectively erasable liquid crystal writing device utilizing pressure of an untethered stylus to create or selectively erase an image.
Figure 2:
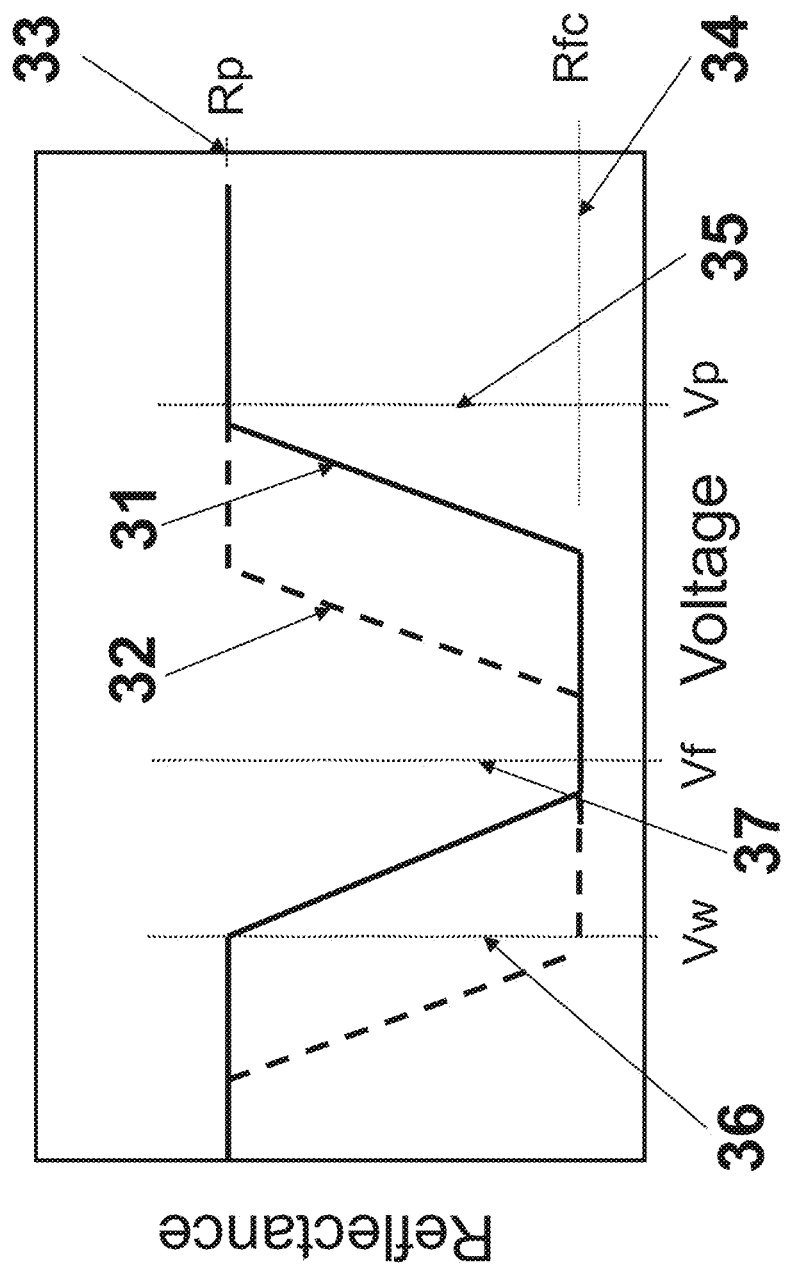
FIG. 2 (PRIOR ART): Reflectance versus voltage curves used to illustrate full and select erase voltages.
Figure 3:
FIG. 3 (PRIOR ART): Image written in Mode B on a single layer selectively erasable liquid crystal writing device.
Figure 4:
FIG. 4 (PRIOR ART): Image on the liquid crystal writing device of FIG. 3 selectively erased.

FIG: 7: A schematic view of the liquid crystal eWriter device of Example 3 of this disclosure including electronic circuitry of the device; and FIG: 8A-D: Detailed schematics showing electronic circuitry for implementing the disclosure including the examples.

DETAILED DESCRIPTION

All of the features of the EWRITER WITH SELECT ERASE BY KENT DISPLAYS INC. as described in the text and FIGS. 1-4 above and in U.S. Pat. No. 8,139,039 are incorporated by reference. That eWriter device is modified as discussed below.

Referring to FIGS. 1 and 5-7, the eWriter device 800, 800', 800" with adjustable select erase of this disclosure includes an optional housing 809. The eWriter display 804 includes substrates 11 spaced apart from each and disposed in the housing. A front one of the substrates is formed of a flexible polymeric material and included is an optional back one of the substrates. The back substrate may be rigid or flexible. For example, the back substrate may be formed of a polymeric material, which is optionally clear and optionally flexible. Electrically conductive layers 12 are spaced apart from each other and disposed between the front and back substrates. A dispersion layer 23 includes a dispersion of cholesteric liquid crystal material and polymer and is disposed between the electrically conductive layers. Spacers or other structure maintains a gap between the electrically conductive layers. An optional light absorbing layer 19, 19' absorbs light passing through the dispersion layer 23. While the layers or components of the eWriter, including one or both of the substrates, coatings on them and the electrically conductive layers, may be optically clear, this does not indicate the need for a precise degree of transparency. The eWriter is designed so that certain layers or components, or all layers or components, are see-through. Pressure applied to the upper substrate using a stylus or fingernail changes a reflectance of the cholesteric liquid crystal material forming an image. Electronic circuitry 840, 840' and 840" is disposed in the housing (FIGS. 5-7) and is adapted to fully and selectively erase the image by applying a full erase voltage waveform and a select erase voltage waveform, respectively, to the electrically conductive layers 12. The image is partially or selectively erased (i.e., in Mode B) by applying a select erase voltage waveform to the electrically conductive layers while applying pressure to the upper substrate and tracing a portion of the image. A select erase actuator (at least one of switches 806-808, 815 and optionally 805 or 820 of FIGS. 5-7) is included in the electronic circuitry and enables a user to adjust the select erase voltage waveform (e.g., increase or decrease the amplitude or voltage of the select erase voltage waveform). The electronic circuitry applies the adjusted select erase voltage waveform to the electrically conductive layers to adjust the selective erasing of the image. The electronic circuitry of the eWriter is described in more detail below with regard to FIGS. 5-7 and FIG. 8A-D.

The dispersion layer 23 of the eWriter can include a blend of polymerizable monomer, crosslinker, photoinitiator, non-polymerizable cholesteric liquid crystal and spacers. The dispersion layer can be phase separated into an open celled cholesteric liquid crystal polymer structure in which the liquid crystal can flow when pressure is applied without damaging the polymer structure. The chemistry of the dispersion can be similar to that in U.S. Pat. No. 8,228,301.

The optional housing 809 can also be referred to as a bezel and can contain the components of the eWriter including the electronic circuitry and eWriter display. The housing can be in the shape of a frame around the eWriter display and provides a way for securing the at least one actuator for user adjustment. The housing ruggedizes the eWriter. Variations of the eWriter may not employ a typical housing, for example, the eWriter can be partially or fully encased in a polymeric material, for example, a rigid clear polymer, and having the actuators in electrical contact with the electrical circuitry but accessible to the user through the polymer. Rather than containing all components in a housing, the eWriter may have the circuitry constructed and arranged differently than in a housing, for example, in a separate layer or segment of the device.

The light absorbing layer 19 is disposed more distal from the user than the dispersion layer 23 is from the user and absorbs light passing through the dispersion layer. This layer 19 can be a color or dark (e.g., black) and is opaque. When layer 19 is dark and the eWriter is placed in the focal conic initial texture, the eWriter appears dark.

Alternatively, rather than the opaque light absorbing back layer a semitransparent back layer 19' that absorbs light from the dispersion layer can be disposed more distal from the user than the dispersion layer 23 is from the user. The semitransparent back layer 19' can be used with or without a back substrate that is disposed below the dispersion layer. A suitable semitransparent back layer is described in U.S. Pat. No. 9,116,379, entitled "Electronic Display with Semitransparent Back Layer," which is incorporated herein by reference in its entirety. The semitransparent back layer 19' can provide suitable contrast to the liquid crystal writing device or eWriter while permitting articles behind the eWriter to be seen. In one aspect the semitransparent back layer 19' absorbs light that passes through the dispersion layer 23, reflects grey light or light of a color and is light transmitting. In one example, the semitransparent back layer 19' can form a bottom surface of the eWriter, or a semitransparent or clear layer can be disposed below the semitransparent back layer and forms a bottom surface of the eWriter.

The eWriter device 800, 800', 800" may be used with a back pattern that is removably disposed behind the semitransparent back layer, wherein the pattern is visible through the semitransparent back layer 19'. The back pattern can comprise a waveguide including light sources disposed at an edge thereof, and light emitting portions on a surface of the waveguide enabling light to leave the waveguide in a pattern. The back pattern can comprises an emissive, backlit or reflective display device for displaying images. The back pattern can be selected from the group consisting of: a template of a sports field, court or arena, a pattern for a children's game, an image for children to color, notepad lines, graph paper lines, and a menu of items that one can choose from. This back pattern may be able to be detachably affixed to the bottom of the eWriter. On the other hand, the eWriter is adapted to be placed over a variety of articles for viewing, the articles being free of attachment to the display. The semitransparent back layer 19' may comprise ink or pigment coated or printed on, or disposed inside, a transparent substrate. It may also be in the form of a color filter.

The eWriter device 800, 800', 800" can be written on with any suitable stylus 16 or with a fingernail. The stylus 16 can be a pointed object made of plastic or other suitable material that does not leave ink on the display when writing. The same pointed end of the stylus 16, or a more blunt eraser end of the stylus 16, can be used as an eraser for select erasing. The eraser may be formed of the same or a different material than the stylus. For example, the stylus 16 could be formed of polymer having a pointed tip at one end while at the other end an eraser is disposed, formed of a softer polymer, for example, a softer synthetic polymer or rubber. An eraser completely separate from the stylus and eWriter could also be used for select erase, having any desired shape.

The present disclosure will now be described by way of examples which are for explanatory purposes and should not be used to limit the subject matter of this disclosure.

EXAMPLE 1

Figure 5:
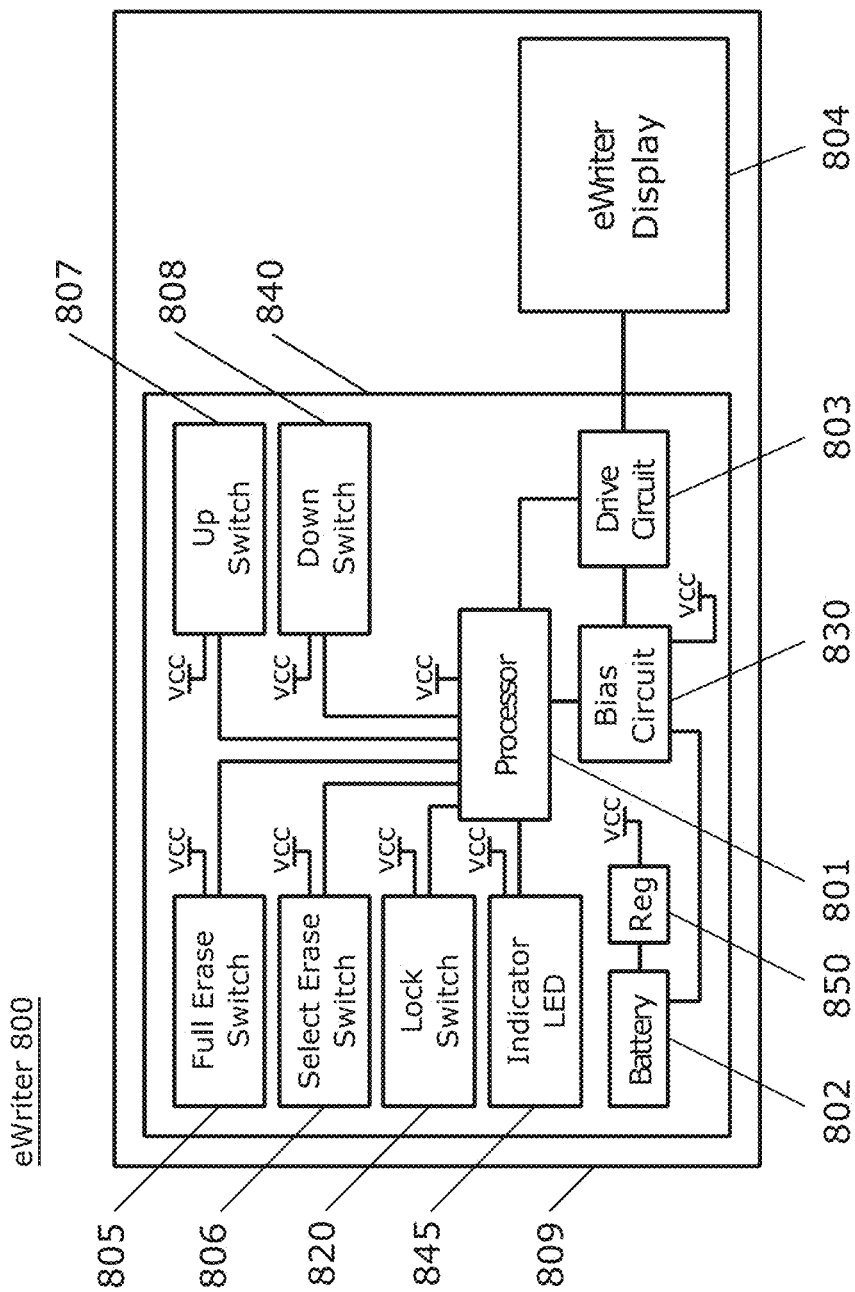
FIG. 5: A schematic view of the liquid crystal eWriter device of Example 1 of this disclosure including electronic circuitry of the device.

A general design block diagram of an example embodiment is shown in FIG. 5. A liquid crystal eWriter device 800 includes an eWriter display or writing surface 804, and associated electronic circuitry 840. The circuitry includes a processor 801, bias circuit 830, eWriter drive circuit 803 and a battery 802 as the power supply for the electronic circuitry. The processor 801 may be a general purpose microcontroller such as a member of the MSP430 or Tiva families from Texas Instruments. In all example embodiments, the battery connects directly to the linear regulator 850 to generate the logic power VCC and also connects to the bias circuit 830. The logic power VCC from the linear regulator is received by the components of the device as indicated in the drawings. In cases where the battery directly supplies a voltage suitable for use as the logic power VCC, for example in the case of powering the device from a 3V coin cell, the linear regulator may be removed and VBAT connected directly to VCC.

The electronic circuitry 840 of the eWriter of FIG. 5 includes five switches or actuators: a FULL ERASE switch 805, a SELECT ERASE switch 806, a voltage UP switch 807 (e.g., or a select erase UP switch when the select erase waveform is changed by frequency or duty cycle), a voltage DOWN switch 808 (e.g., or a select erase DOWN switch when the select erase waveform is changed by frequency or duty cycle) and a LOCK switch 820 that when activated prevents the Full Erase Switch from fully erasing the image. SELECT ERASE actuators include the SELECT ERASE switch 806, the UP switch 807 and the DOWN switch 808, enabling user adjustment of select erase.

The image on the eWriter 800 is fully erased by voltage pulses or a voltage waveform of continuous pulses supplied by the drive circuit 803 as disclosed for example, in the U.S. Pat. No. 8,139,039 patent. Although select erase voltage pulses are also described in the U.S. Pat. No. 8,139,039 patent, this patent does not describe an eWriter with user adjustable select erase.

The eWriter device 800 of this example is a large format eWriter that is operated in Mode B. The FULL ERASE switch is pressed by the user to erase the entire device to the focal conic (dark) texture. The focal conic texture is substantially transparent and reveals a dark or color back layer or a semitransparent back layer. The user writes on the display using a stylus, with the device displaying the planar (bright) texture where it has been written on. The stylus can be composed of polymer or other material with a pointed tip and does not leave ink on the writing/drawing surface. Pressing the SELECT ERASE switch puts the device in SELECT ERASE MODE. In this mode, a fingernail, the stylus or similar instrument is used to apply pressure (select erase pressure) to the eWriter while tracing a portion of the image, partially erasing the display to the focal conic (dark) texture where the pressure is applied.

While the device is in SELECT ERASE MODE, pressing the UP or DOWN switches increase or decrease, respectively, the RMS voltage of the select erase voltage waveform. The processor 801 adjusts the RMS voltage of the select erase waveform up or down by configuring the bias circuit 830 to provide a DC voltage of the desired waveform amplitude to the drive circuit 803. Alternatively, the bias circuit 830 may be configured to output a fixed DC voltage and the processor 801 adjusts the RMS voltage of the select erase waveform by configuring the drive circuit 803 to vary the duty cycle of the applied pulses. As a further alternative, the bias circuit 830 may be configured to output a fixed DC voltage and the processor 801 adjusts the RMS voltage of the select erase waveform by configuring the drive circuit 803 to vary the frequency of the applied pulses, relying on RC effects to lower the RMS voltage as frequency is increased. The user may adjust the voltage of the select erase voltage waveform down if they notice that written lines which are to be retained are dimming, without select erase pressure being applied. The user may adjust the voltage of the select erase waveform up if they notice that lines they are trying to selectively erase are not able to be erased or require excessive pressure to erase. Pressing the SELECT ERASE switch again disables the SELECT ERASE MODE.

The UP and DOWN switches may produce differing effects based upon the manner in which they are applied. For instance, a single-click feature may adjust the voltage of the select erase waveform up or down by a small amount, for example, by a voltage increment ranging from 50 mV to 250 mV, while a double-click feature may adjust the voltage of the select erase waveform up or down by a relatively larger amount, for example, by a voltage increment of 1V to 2V. The small voltage adjustments and larger voltage adjustments can be preset when programming the processor. This provides a mechanism for the user to quickly make large scale or fine scale adjustments. The adjustable range of the applied voltage for select erase may be limited, for instance, between 2V and 10V.

The eWriter device 800 may optionally include an LED or other lighting component 845. The LED may indicate when the applied select erase voltage level is changed via pressing the UP or DOWN switches to provide feedback to the user that the intent was registered. This indication by the lighting component may include different light pulsing, a different color, or other indication to distinguish that one or the other of the UP switch or DOWN switch is being pressed. As another example, one LED could be one color (e.g., red) for indicating voltage down and another LED could be a different color (e.g., green) for indicting voltage up. Still further, the LED could pulse quickly when applying the feature for larger voltage adjustments (e.g., the double click feature) and could pulse slowly for small voltage adjustments (e.g., the single click feature). This is desirable because the immediate visual effect of making small changes to the applied voltage level can be subtle. LED or other lighting components can be used in any of the other embodiments of this disclosure, including in the examples below.

EXAMPLE 2

Figure 6:
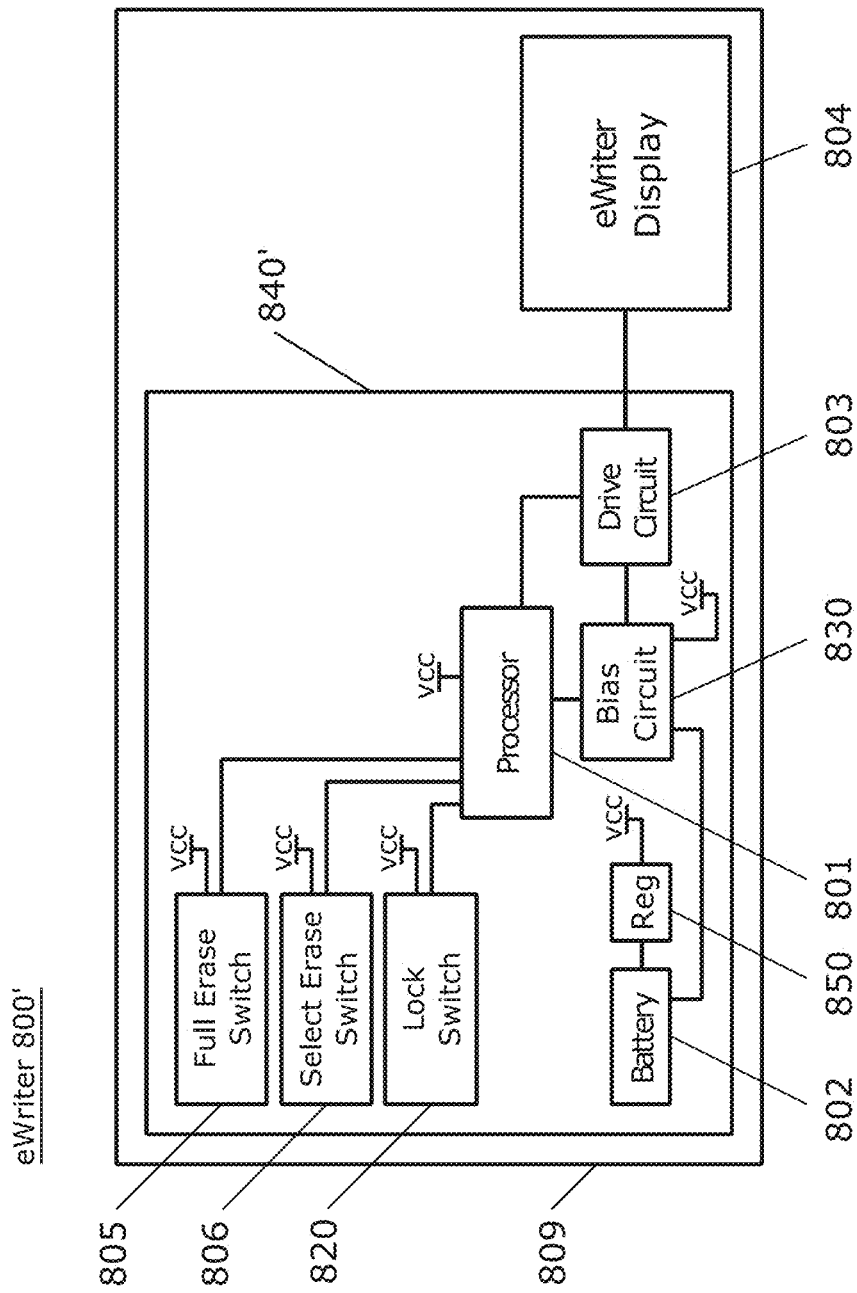
FIG. 6: A schematic view of the liquid crystal eWriter device of Example 2 of this disclosure including electronic circuitry of the device.

A general design block diagram of an example embodiment is shown in FIG. 6 where like reference numbers represent the same or similar elements with regard to FIG. 5. It includes an eWriter device 800' including an eWriter display or writing surface 804 and associated electronic circuitry 840'. The circuitry includes a processor 801, bias circuit 830, eWriter drive circuit 803 and a battery 802 as the power supply for the electronic circuitry. The processor may be a general purpose microcontroller such as a member of the MSP430 or Tiva families from Texas Instruments.

The image on the eWriter 800' is fully erased by voltage pulses or a waveform of continuous pulses supplied by the drive circuit 803 as disclosed for example, in the U.S. Pat. No. 8,139,039 patent.

The letter-sized eWriter writing surface 804 is operated in Mode B. The FULL ERASE switch is pressed by the user to erase the entire device to the initial focal conic (e.g., dark) texture as background. The user writes on the display using a stylus, with the device displaying the planar (bright) color texture where it has been written on, which contrasts with the dark background. Pressing the SELECT ERASE switch puts the device in SELECT ERASE MODE continuously while the switch is pressed by the user, while releasing the SELECT ERASE switch disables the SELECT ERASE MODE.

In SELECT ERASE MODE, the stylus or similar instrument is used to apply select erase pressure to the eWriter by tracing over a portion of the image, partially erasing the display to the focal conic (dark) texture where the select erase pressure is applied and while the select erase voltage waveform is applied.

By default, the select erase voltage waveform is a 10 Hz square wave that oscillates between +/−3.8V. The waveform also includes a short 125 microsecond interval that discharges to 0V before changing polarity (from +3.8V to −3.8V or vice versa) as a power-saving mechanism. The voltage of the select erase voltage waveform may be tuned between 2V and 7V by the user. The current select erase voltage waveform is remembered and reused from one select erase to the next; however, it may revert to the default if the system is reset. The user may tune the select erase voltage only while the SELECT ERASE switch is pressed.

A particular method is to press the FULL ERASE switch while in SELECT ERASE MODE to perform the select erase tuning. When first put into SELECT ERASE MODE (the SELECT ERASE switch is pressed), the current select erase voltage is retained from the most recent previous select erase using values stored in a memory (for example register, RAM, EEPROM, or flash) of the processor 801. If the user wishes to adjust or tune the voltage of the applied select erase voltage waveform, they single-click the FULL ERASE switch while the SELECT ERASE switch is pressed. This first click resets the current select erase waveform voltage to the minimum (2V) level. Further clicks of the FULL ERASE switch increase the current select erase waveform voltage by a small amount (for instance, 250 mV) subject to a maximum level (for instance, 7V). Thus, the SELECT ERASE actuators include the SELECT ERASE switch and the FULL ERASE switch when applied simultaneously with the SELECT ERASE switch, enabling the user to adjust select erasing. At a desired select erase voltage adjustment, the user applies select erase pressure while tracing over a portion (e.g., a portion of a line) of the image and observes the effect. If the line intended to be select erased is not erased fully or excessive force is required to select erase, then the user can increase a voltage of the select erase waveform, apply select erase pressure while tracing over the line and observe the effect again. This can be repeated until the desired select erasing is obtained. The user can stop clicking the FULL ERASE switch once the desired select erasing level is achieved. If they go too far, they can disable the SELECT ERASE MODE by releasing the switch and then once again put the device in the SELECT ERASE MODE by pressing the switch again, so that the first click of the FULL ERASE switch will once again reset the current select erase voltage to the minimum (2V) level.

In the on position, the LOCK switch prevents the FULL ERASE switch from erasing the display. Depending on the device, the LOCK switch may or may not be designed to also prevent putting the device in SELECT ERASE MODE.

Other manners of activating the switches may be used to implement similar logic with the end goal of tuning the select erase voltage waveform. For instance, when the device is in the SELECT ERASE MODE, a short click of the FULL ERASE switch could be used to decrease the voltage of the select erase waveform one step (~250 mV) while a long click of the FULL ERASE switch could be used to increase the voltage of the select erase waveform one step (~250 mV). Alternatively, when the device is in the SELECT ERASE MODE, a single-click of the FULL ERASE switch could be used to decrease the voltage of the select erase waveform one step (~250 mV) while a double-click of the FULL ERASE switch could be used to increase the voltage of the select erase voltage one step (~250 mV).

EXAMPLE 3

Figure 7:
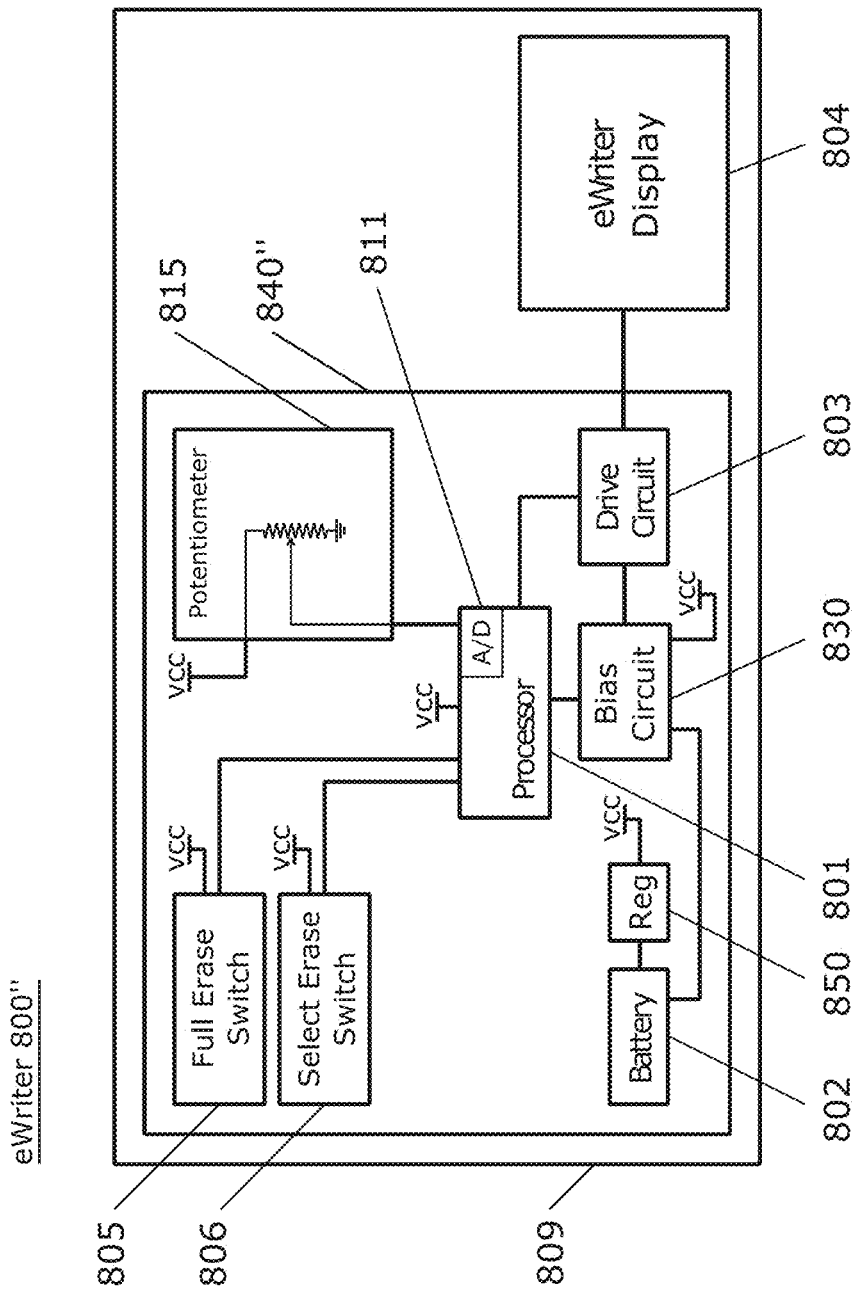

Referring to FIG. 7, like reference numbers represent the same or similar elements with regard to FIG. 5. An eWriter device 800" includes an eWriter display or writing surface 804 and associated electronic circuitry 840". The circuitry includes a processor 801, bias circuit 830, eWriter drive circuit 803 and a battery 802 as the power supply for the electronic circuitry. The processor may be a general purpose microcontroller such as a member of the MSP430 or Tiva families from Texas Instruments.

The eWriter 800" is operated in Mode B. The eWriter includes two switches or actuators, FULL ERASE switch 805 and SELECT ERASE switch 806, and a dial or slider actuator 815. The FULL ERASE and SELECT ERASE switches function the same as in EXAMPLE 1. A potentiometer includes a rotating or sliding contact. The adjustable voltage divider provided by the potentiometer provides a voltage level that may be used to adjust the applied select erase voltage (or possibly duty cycle or frequency of the select erase voltage waveform). In this case, the user turns the dial or slides the slider to produce the same effect as pressing the UP/DOWN switches in EXAMPLE 1. Thus, the SELECT ERASE actuators include the SELECT ERASE switch and the potentiometer.

EXAMPLE 4

An 8.5" eWriter device is operated in Mode B. The eWriter includes a single momentary switch or actuator called ERASE. A double-click of the ERASE switch causes a full erase of the writing tablet. Pressing and holding the ERASE switch puts the device in SELECT ERASE MODE for the duration the ERASE switch is held. A single-click of the ERASE switch followed immediately by a hold enables select erase at decreased voltage. A double-click of the ERASE switch followed immediately by a hold enables select erase at increased voltage. Thus, the single ERASE switch functions as the SELECT ERASE actuator.

Figure 8A:
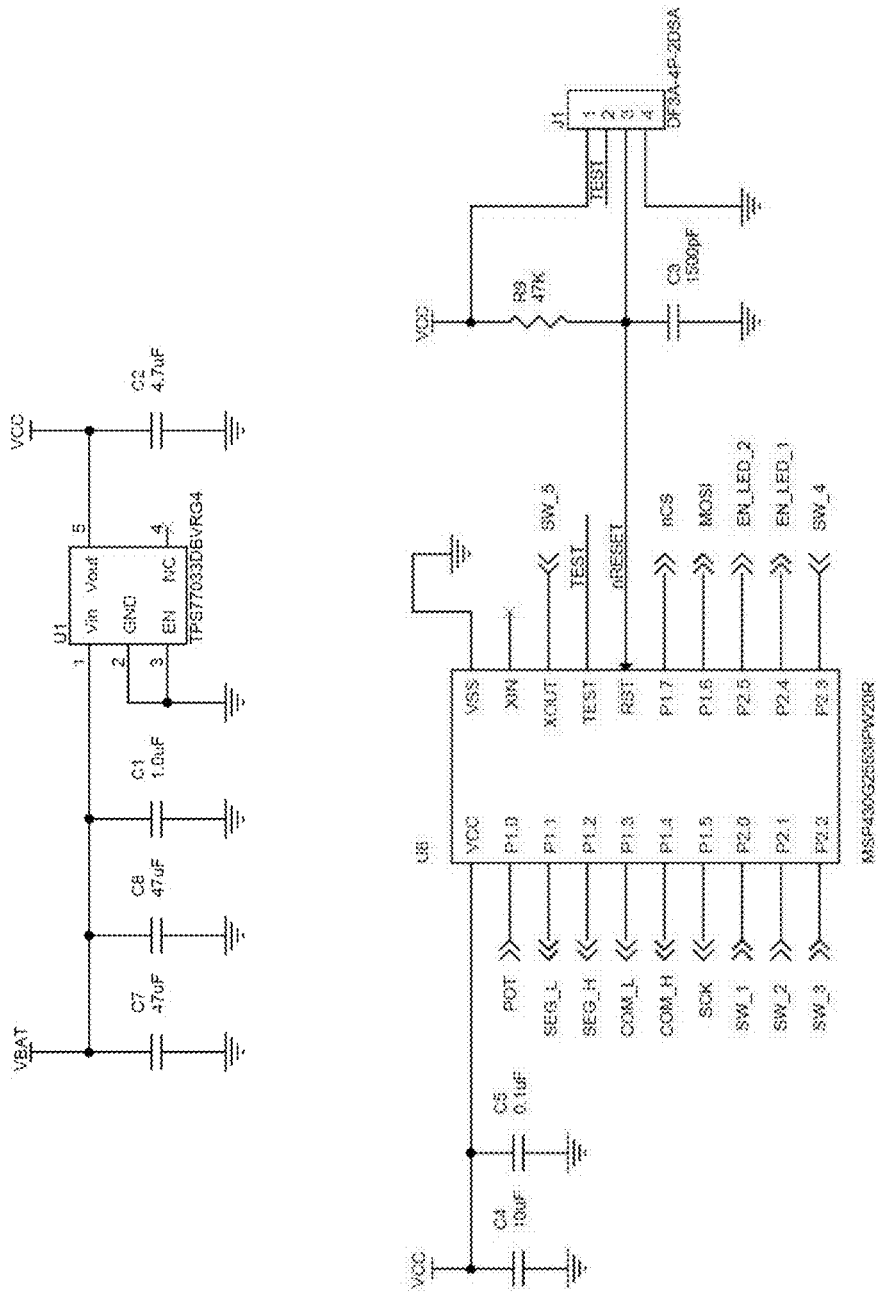

FIGS. 8A-D provide schematics for circuitry suitable to implement the aspects of the disclosure including Examples 1-4. Referring to FIG. 8A, a battery, for instance 4 AA alkaline batteries connected in series, or other suitable power supply provides a voltage VBAT to power the system. A low-dropout linear regulator U1, in this case a Texas Instruments' TPS77033, generates the logic power supply VCC from VBAT. A Texas Instruments' MSP430G2553 microcontroller provides the processing for the system. All I/O connected to the microcontroller are digital, with the exception of the POT signal. The POT signal is an analog input that may be programmatically configured for measurement by the built-in analog to digital (A/D) converter of the microcontroller. Also shown is standard reset and programming circuitry for the microcontroller, including C3, R9, and header J1.

Figure 8B:
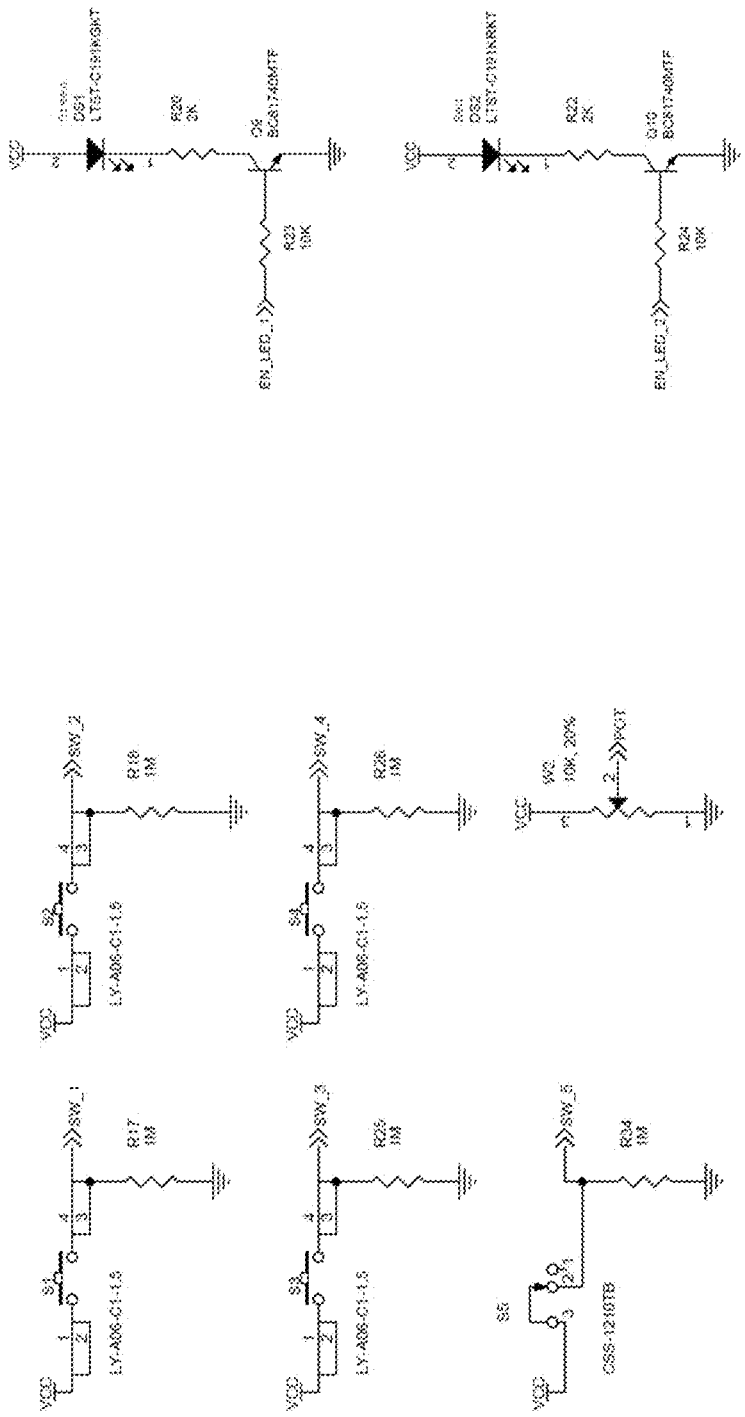

FIG. 8B provides a series of momentary switches S1-S4 and a toggle switch S5. The states of these switches are indicated by signals SW_1-SW_5, which are provided to general purpose I/O pins of the microcontroller. The microcontroller may use well-known techniques involving interrupts, polling, and debouncing to detect events on the switches resulting from user input. A potentiometer W2 is also included as a means of user input. Through the action of moving a slider or turning a dial, the user may adjust the POT signal between VCC and ground. As previously mentioned, this analog signal is provided to the microcontroller for conversion to a digital value by an internal A/D. By this means, the digital value represents the setting of the slider or dial as set by a user. Also shown are two LEDs DS1 and DS2 which may be turned on programmatically by setting the EN_LED_1 and EN_LED_2 microcontroller outputs, respectively, to the VCC level.

Figure 8C:
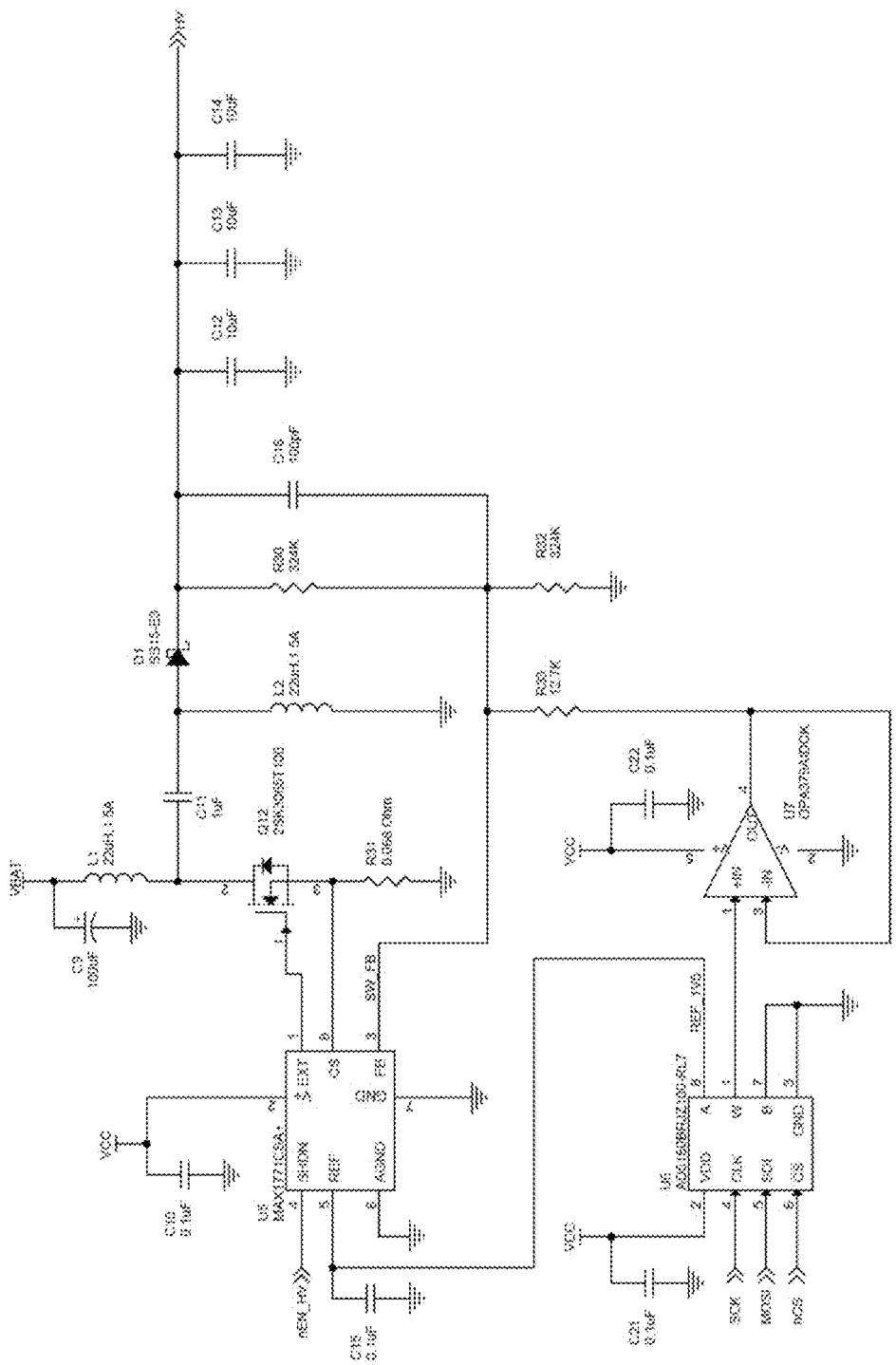

FIG. 8C provides a bias circuit for generating an adjustable DC voltage HV on C12-C14 from the VBAT voltage. The bias circuit is built around U5, a MAX1771 DC-DC controller from Maxim Integrated. One familiar in the art will recognize that L1, L2, C11, C12-C14, D1, and Q12 are arranged to put the DC-DC controller in a SEPIC configuration. A SEPIC (single-ended primary-inductor converter) is a type of DC/DC converter that allows the voltage at the output to be greater than, less than, or equal to that at the input.

Voltage level adjustment is provided by U6, an AD5160 from Analog Devices. The AD5160 is a 256-Position SPI-Compatible Digital Potentiometer. A 1.5V reference is provided to the AD5160 from the MAX1771. The microcontroller may use the SPI interface provided by SCK, MOSI, and nCS to set a value D between 0 and 255 in the digital potentiometer. The wiper W of the digital potentiometer outputs a voltage equal to $(D/256)*1.5V$, which is buffered by Texas Instruments' OPA379 op-amp U7 and provided to R33. When enabled via the nEN_HV signal from the microcontroller, the MAX1771 regulates the voltage on its feedback input FB to 1.5V via switching action of Q12. The feedback circuit consisting of R30 and R32, along with the voltage (D/256)*1.5V injected through R33, causes the output voltage HV to regulate to HV=1.5V*(1+R30/R32+R30/R33*(1−D/256)). This equates to HV=41.25V−D*0.149V for values of R30, R32, and R33 in the schematic. Thus, as configured the bias circuit can generate voltages of HV in the range of 3.13V to 41.25V. One skilled in the art will recognize that this range can be modified by suitable changes to R30, R32, and R33. C16 serves the purpose of a feedforward capacitor to improve DC-DC converter performance as known in the art.

The bias circuitry may also be modified to employ a boost converter that integrates features to enable adjusting the output voltage without need of an external digital potentiometer. Suitable boost converters are Texas Instruments boost converters: TPS61045 (Digitally Adjustable Boost Converter SLVS440C brochure dated January 2003-Revised December 2014) and TPS61170 (1.2-A High-Voltage Boost Converter in 2-mm×2 mm2 QFN package brochure SLVS789D dated November 2007-Revised December 2014), both of which are incorporated herein by reference in their entireties. The TPS61045 boost converter demonstrates modifying the boost voltage by using an internal DAC or an analog input to alter the feedback circuit. The TPS61170 boost converter allows either a digital interface or pulse width modulation (PWM) input to modify the boost voltage by changing a feedback reference voltage.

Figure 8D:
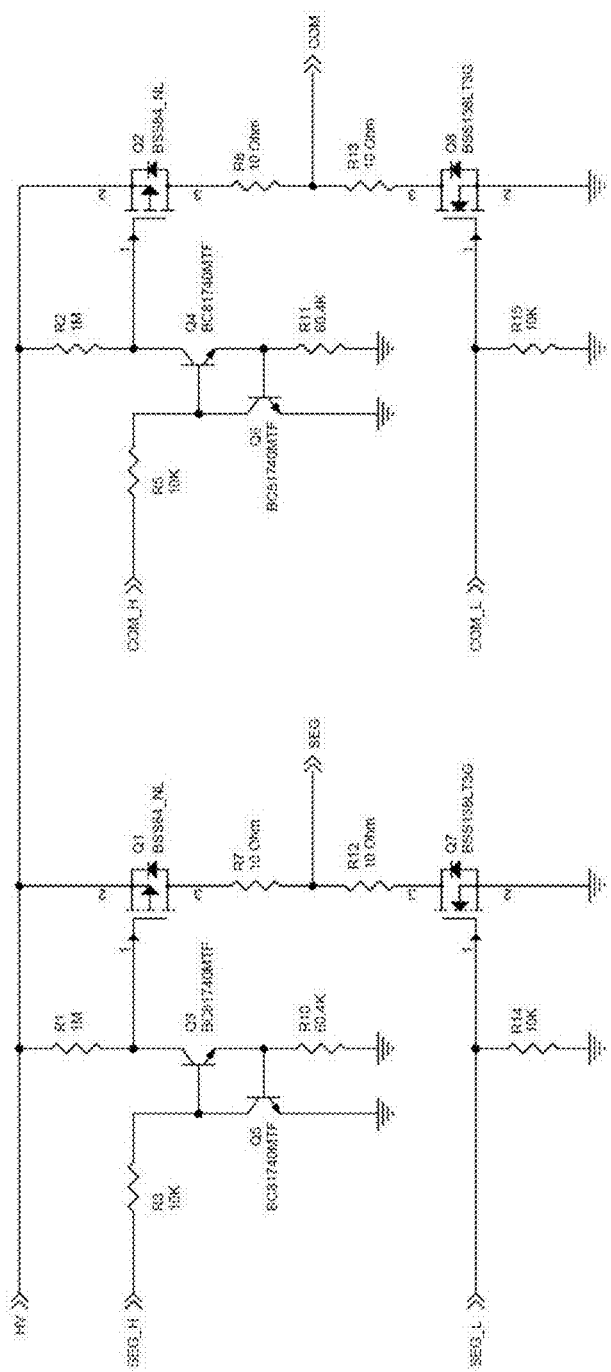

FIG. 8D provides a drive circuit for applying the bias voltage HV generated by the bias circuit to the electrodes 12, identified individually by signals SEG and COM in FIG. 8D. The SEG_L and COM_L signals from the microcontroller enable individually connecting either electrode to ground via a transistor Q7 or Q8 and a current-limiting resistor R12 or R13. Likewise, the SEG_H and COM_H signals from the microcontroller enable connecting either electrode to HV via Q1 or Q2 and a current-limiting resistor R7 or R8. Transistors Q3 and Q4 serve the purpose of turning on Q1 and Q2 through the voltage drops developed across R1 and R2, respectively. R10 and Q5 limit the current through R1 to protect Q1 from excessive gate to source voltage at high HV levels, while R11 and Q6 do the same for R2 and Q2.

Many modifications and variations of the subject matter of the disclosure will be apparent to those of ordinary skill in the art. Therefore, it is to be understood that the subject matter of the disclosure can be practiced otherwise than has been specifically shown and described.

What is claimed is:

1. A liquid crystal eWriter device with user adjustable select erase, comprising:
  a front substrate formed of a flexible, polymeric material;
  electrically conductive layers that are spaced apart from each other;
  a dispersion layer including a dispersion of cholesteric liquid crystal material and polymer disposed between said electrically conductive layers, wherein pressure applied to said front substrate changes a reflectance of said cholesteric liquid crystal material forming an image;
  electronic circuitry that is adapted to fully and partially erase the image by applying a full erase voltage waveform and a select erase voltage waveform, respectively, to said electrically conductive layers, wherein the image is select erased by applying said select erase voltage waveform to said electrically conductive layers while applying pressure to said front substrate and tracing a portion of the image; and
  at least one SELECT ERASE actuator included in said electronic circuitry and enabling a user to adjust said select erase voltage waveform so as to adjust select erasing of the image.

2. The liquid crystal eWriter device of claim 1, said at least one SELECT ERASE actuator comprising a first SELECT ERASE actuator, a SELECT ERASE-UP actuator and a SELECT ERASE-DOWN actuator, wherein said electronic circuitry includes electronic drive circuitry, a bias circuit and a processor that is programmed with software that enables adjustable select erase voltage waveforms to be applied to said electrically conductive layers, wherein activating said first SELECT ERASE actuator puts said liquid crystal eWriter device in SELECT ERASE MODE, wherein while the SELECT ERASE MODE is on, activating said SELECT ERASE-UP actuator or said SELECT ERASE-DOWN actuator increases or decreases, respectively, RMS voltage of said select erase voltage waveform, and wherein said processor adjusts the RMS voltage up or down according to one of the following:
  by configuring said bias circuit to provide a DC voltage of a desired waveform amplitude to said drive circuit;
  when said bias circuit is configured to output a fixed DC voltage, by configuring said drive circuit to vary a duty cycle of applied pulses; and
  when said bias circuit is configured to output a fixed DC voltage, by configuring said drive circuit to vary a frequency of applied pulses, relying on RC effects to lower the RMS voltage as frequency is increased.

3. The liquid crystal eWriter device of claim 1 including a FULL ERASE actuator included in said electronic circuitry, wherein activating said FULL ERASE actuator results in said electronic circuitry applying said full erase voltage waveform that erases all of the image.

4. The liquid crystal eWriter device of claim 1, said at least one SELECT ERASE actuator comprising a first SELECT ERASE actuator, a SELECT ERASE-UP actuator and a SELECT ERASE-DOWN actuator, wherein activating said first SELECT ERASE actuator puts said device in SELECT ERASE MODE, wherein activating said SELECT ERASE-UP actuator in said SELECT ERASE MODE enables the user to change characteristics of said select erase voltage waveform so as to increase said select erasing and activating said SELECT ERASE-DOWN actuator in said SELECT ERASE MODE enables the user to change characteristics of said select erase voltage waveform so as to decrease said select erasing, wherein deactivating said first SELECT ERASE actuator takes said liquid crystal eWriter device out of said SELECT ERASE MODE.

5. The liquid crystal eWriter device of claim 4 wherein said SELECT ERASE-UP actuator and said SELECT ERASE-DOWN actuator include features enabling making small adjustments and making larger adjustments to the amplitude of said select erase voltage waveform.

6. The liquid crystal eWriter device of claim 5 wherein said small adjustments to the amplitude of said select erase voltage waveform are made in increments ranging from 50 mV to 250 mV, while said larger adjustments to the amplitude of said select erase voltage waveform are made in increments of 1V to 2V.

7. The liquid crystal eWriter device of claim 1, said at least one SELECT ERASE actuator comprising a first SELECT ERASE actuator adapted to put said device in SELECT ERASE MODE and a potentiometer with a rotating or sliding contact, wherein an adjustable voltage divider of the potentiometer enables adjustment of said select erase voltage waveform.

8. The liquid crystal eWriter device of claim 7 wherein said electronic circuitry includes an analog to digital converter that converts an analog voltage level of said potentiometer to a digital signal indicating said adjustment of said select erase voltage waveform.

9. The liquid crystal eWriter device of claim 1 said at least one SELECT ERASE actuator comprising a first SELECT ERASE actuator adapted to put said device in SELECT ERASE MODE and a potentiometer with a rotating or sliding contact, wherein said potentiometer is configured as a variable resistor and placed in series with an electrical interconnect that is connected to one of said electrically conductive layers, wherein said select erase voltage waveform is applied at a frequency such that tuning said variable resistor alters an RMS value of said select erase voltage waveform on said electrically conductive layers by changing an RC time constant comprised of resistance in series with said dispersion layer and a capacitance of said dispersion layer.

10. The liquid crystal eWriter device of claim 1 comprising a FULL ERASE actuator having a first feature to carry out said full erase and at least one second feature to adjust an amplitude of said select erase voltage waveform, wherein said at least one SELECT ERASE actuator comprises a first SELECT ERASE actuator and said at least one second feature of said FULL ERASE actuator, wherein activating said first SELECT ERASE actuator applies said select erase voltage waveform, and simultaneously applying said second feature of said FULL ERASE actuator:
  in a first instance drops the amplitude of said select erase voltage waveform to a minimum level, and
  in subsequent instances successively increases the amplitude of said select erase voltage waveform by a set increment up to a maximum level.

11. The liquid crystal eWriter device of claim 10 comprising a LOCK actuator which when activated prevents said FULL ERASE actuator from carrying out said full erase.

12. The liquid crystal eWriter device of claim 1 comprising a FULL ERASE actuator having a first feature to carry out said full erase and at least one second feature to adjust an amplitude of said select erase voltage waveform, wherein said at least one SELECT ERASE actuator comprises a first SELECT ERASE actuator and said at least one second feature of said FULL ERASE actuator, wherein activating said first SELECT ERASE actuator applies said select erase voltage waveform, and simultaneously applying said second feature of said FULL ERASE actuator enables at least one of:
  selecting and applying a small increment in the amplitude of said select erase voltage waveform or a larger increment in the amplitude of said select erase voltage waveform, and
  selecting and applying the amplitude of said select erase voltage waveform up or down.

13. The liquid crystal eWriter device of claim 12 wherein said at least one second feature comprises at least one of:
  a single or double click on said FULL ERASE actuator, and
  a short pressing or a longer pressing of said FULL ERASE actuator.

14. The liquid crystal eWriter device of claim 1 wherein said eWriter includes an ERASE actuator that is single and momentary, wherein a double-click of said ERASE actuator causes said full erase, pressing and holding said ERASE actuator causes said ERASE actuator to function as said at least one SELECT ERASE actuator and for said device to be put in SELECT ERASE MODE for the duration said ERASE actuator is held, a single-click of said ERASE actuator followed immediately by a hold enables select erase at decreased amplitude of said select erase voltage waveform and a double-click of said ERASE actuator followed immediately by a hold enables select erase at increased amplitude of said select erase voltage waveform.

15. The liquid crystal eWriter device of claim 2 wherein said processor limits adjustments in the RMS voltage to fall within at least one of a predetermined voltage increment and a predetermined voltage range.

16. The liquid crystal eWriter device of claim 1 comprising an indicator light as part of said electronic circuitry, wherein said indicator light indicates when said select erase voltage waveform is being adjusted.

17. The liquid crystal eWriter device of claim 1 comprising an opaque light absorbing layer disposed more distal from the user than said dispersion layer is from the user, wherein said light absorbing layer absorbs light that passes through said dispersion layer.

18. The liquid crystal eWriter device of claim 1 comprising a semitransparent back layer disposed more distal from the user than said dispersion layer is from the user, wherein said semitransparent back layer absorbs light that passes through said dispersion layer, reflects grey light or light of a color and is light transmitting.

19. The liquid crystal eWriter device of claim 1 including substrates spaced apart from each other including said front substrate, said front substrate being formed of an optically clear said polymeric material, wherein said electrically conductive layers are disposed between said substrates.

20. A method of adjusting select erase on the eWriter of claim 1, the eWriter including an image, comprising
  (a) activating a first of said at least one SELECT ERASE actuator;
  (b) applying said select erase voltage waveform while applying said select erase pressure;
  (c) observing the degree to which the image is select erased;
  (d) if the image is not able to be select erased or requires excessive said select erase pressure to select erase, then the user adjusts said at least one SELECT ERASE actuator to adjust the select erase voltage waveform to increase select erasing;
  optionally repeating any of steps (b)-(d);
  once the image is select erased to a degree desired by the user, deactivating said first SELECT ERASE actuator.

21. The method of claim 20 comprising
  (e1) evaluating whether said image dims while said select erase voltage waveform is applied but said select erase pressure is not applied;
  (e2) if results of step (e1) are positive, then the user adjusts said at least one SELECT ERASE actuator to adjust the select erase voltage waveform to decrease select erasing; and
  optionally repeating any of steps (b)-(d), (e1) and (e2).

* * * * *